(12) United States Patent
Cabrera et al.

(10) Patent No.: US 11,268,938 B2
(45) Date of Patent: Mar. 8, 2022

(54) MONOLITHIC SORBENTS HAVING A METAL CLADDING

(71) Applicant: Merck Patent GmbH, Darmstadt (DE)

(72) Inventors: Karin Cabrera, Dreieich (DE); Klaus Kreher, Muenster (DE); Gisela Jung, Weiterstadt (DE)

(73) Assignee: Merck Patent GmbH, Darmstadt (DE)

( * ) Notice: Subject to any disclaimer, the term of this patent is extended or adjusted under 35 U.S.C. 154(b) by 478 days.

(21) Appl. No.: 15/778,649

(22) PCT Filed: Oct. 28, 2016

(86) PCT No.: PCT/EP2016/001802
§ 371 (c)(1),
(2) Date: May 24, 2018

(87) PCT Pub. No.: WO2017/088948
PCT Pub. Date: Jun. 1, 2017

(65) Prior Publication Data
US 2018/0348174 A1    Dec. 6, 2018

(30) Foreign Application Priority Data

Nov. 25, 2015  (EP) .................................... 15196322

(51) Int. Cl.
*G01N 30/60*  (2006.01)
*G01N 30/52*  (2006.01)

(52) U.S. Cl.
CPC ......... *G01N 30/6052* (2013.01); *G01N 30/52* (2013.01); *G01N 2030/528* (2013.01)

(58) Field of Classification Search
None
See application file for complete search history.

(56) References Cited

U.S. PATENT DOCUMENTS

| 3,509,617 | A | * | 5/1970 | Winter .................. B21K 25/00 |
| | | | | 228/115 |
| 4,157,079 | A | | 6/1979 | Kristiansen |
| 2002/0166816 | A1 | | 11/2002 | Allen et al. |
| 2005/0005446 | A1 | | 1/2005 | Mayfield |
| 2005/0155933 | A1 | | 7/2005 | Ma |
| 2006/0032816 | A1 | | 2/2006 | Marcus |

(Continued)

FOREIGN PATENT DOCUMENTS

| JP | 52076091 A | 6/1977 |
| JP | 2004525777 A | 8/2004 |
| JP | 2005171829 A | 6/2005 |

(Continued)

OTHER PUBLICATIONS

International Search Report PCT/EP2016/001802 dated Feb. 9, 2017.

(Continued)

*Primary Examiner* — Kara M Peo
(74) *Attorney, Agent, or Firm* — Millen White Zelano & Branigan, PC

(57) ABSTRACT

The invention relates to monolithic sorbents which are clad with tubes made of metal. The metal cladding can be applied directly to the monolithic sorbents by cold forming. This enables very mechanically stable cladding of the monolithic sorbents with minimal dead space.

15 Claims, 8 Drawing Sheets

(56) References Cited

U.S. PATENT DOCUMENTS

2015/0068979 A1   3/2015   Cabrera Perez et al.

FOREIGN PATENT DOCUMENTS

| JP | 2015513105 A | 4/2015 |
| WO | 2013152829 A1 | 10/2013 |
| WO | 2014199444 A1 | 12/2014 |

OTHER PUBLICATIONS

Notice for reason for refusal dated Aug. 24, 2020 (pp. 1-3) and Search Report dated Aug. 26, 2020 (pp. 1-10) in corresponding Japanese Patent Application No. 2018-526871.

* cited by examiner

Fig. 5

ACN/water 60/40 0.85 ml/min
Pre-test
N/m 96.110 – TUSP 1.30

⬇ Doubling of the flow rate

ACN/water 60/40 1.7 ml/min
N/m 89.880 – TUSP 1.33

⬇ Doubling of the flow rate

ACN/water 60/40 3.4 m/min
N/m 61.160 – TUSP 1.25

⬇ Doubling of the flow rate

ACN/water 60/40 6.8 ml/min
N/m 29.470 – TUSP 1.39

⬇

ACN/water 60/40 0.85 ml/min retest
N/m 91.060 – TUSP 1.44

MONOLITHIC SORBENTS HAVING A METAL CLADDING

The invention relates to monolithic sorbents which are clad with tubes made of metal, preferably stainless steel. The metal cladding can be applied directly to the monolithic sorbents by a particular production process. This enables very mechanically stable cladding of the monolithic sorbents with minimal dead space.

For the production of conventional chromatography columns containing particulate sorbents, the filling material is introduced under pressure into a stainless-steel or plastic tube with accurately fitting ends. The result of this is that the sorbent bed is in close contact with the jacket of the column, and the particles are homogeneously distributed over the entire cross section of the column If, as disclosed, for example, in WO 94/19 687 and in WO 95/03 256, particulate sorbents are replaced by monolithic sorbents, the problem arises of sealing off the sorbent cladding in a liquid-tight and pressure-stable manner. Inorganic or organic mouldings can shrink during their production, meaning that they can often not remain in the original shape.

They are therefore typically provided with a new liquid-tight and pressure-stable cladding. Only in this way is it ensured that sample and eluent are transported exclusively through the sorbent.

Commercially available monolithic HPLC columns based on silica gel therefore currently usually consist of a porous silica-gel rod which is clad with a mechanically stable and solvent-resistant polymer in order to be able to pump the mobile phase through the column for the HPLC.

A disadvantage of the monolithic HPLC columns produced in this way is their limitation with respect to pressure stability. With corresponding eluent systems and flow rates, the columns can only be operated up to a maximum column back pressure of 200 bar since the organic polymer cladding gives at excessively high pressures.

The quality of a monolithic column for HPLC can be described, for example, via the separation efficiency (N/m) on the one hand and via the peak symmetry on the other hand. A good analytical column has separation efficiencies of about 70,000-100,000 N/m. In the ideal case, the peak shape corresponds to a Gaussian bell shape. Deviations from this symmetrical shape result in "fronting" or "tailing". The inherent separation efficiency of the column body and the peak symmetry should not change any further after cladding for solvent-tight termination, i.e. with minimal dead space, in the chromatographic use test.

In the case of unsuitable claddings, the cladding is not in close contact with the column body with minimal dead space. The column exhibits pre-peaks or at least "peak fronting" from the beginning as a consequence of faster passage of the sample at the column body/cladding interface.

Claddings with unsuitable polymers may also still give good separation efficiency and peak symmetry in the first chromatographic test, but result in a change/deterioration of the two quality parameters on further use. Claddings with polymers that are in principle suitable may also exhibit these effects if the column back pressure is too high.

By contrast, conventional HPLC columns containing particulate sorbents are significantly more pressure-stable. They usually consist of a stainless-steel tube, into which suspensions of silica-gel particles are introduced using high pressures (>500 bar). These columns are usually pressure-stable up to about 400 bar. More recent HPLC columns for UHPLC (ultra high pressure liquid chromatography) likewise consist of suitable stainless-steel tubes, into which the silica-gel suspensions are introduced at even higher pressures. The reason for the high pressure stability of the particulate columns is, in particular, the stainless-steel column tube.

It would therefore be desirable also to be able to employ stainless-steel tubes as cladding of monolithic sorbents.

In S. Miyazaki et al, J. Chromatogr. 2011, 1218, pp. 1988-1994, monolithic columns comprising silica gel are introduced into a stainless-steel tube. To this end, the monoliths are firstly surrounded with a polymer tube (for example Teflon shrink tube). The monoliths clad in this way are then introduced into a stainless-steel tube, and the space between the polymer-clad monolith and the stainless-steel tube is filled with a liquid plastic (epoxy resin), which then subsequently cures. The process for the production of these columns is very complex. In addition, it has been found that these columns do not result in increased pressure stability, since both plastic interlayers are flexible and give on application of pressure.

Also known are monolithic columns having a stainless-steel cladding in which the monolithic sorbent is polymerised directly into the stainless-steel tube (for example described in J. Zhong et al. J. Chromatogr. 2014, 1333, pp. 79-86 or F. Yang et al, Anal. Bioanal. Chem. 2013, 405, pp. 6639-6648). A disadvantage of these columns is that the polymer network in the stainless-steel tube shrinks during production of the sorbent. This results in dead spaces at the monolith/stainless-steel tube interface, which result in reduced separation efficiencies.

It has now been found that monolithic sorbents, for example based on silica gel, can be clad with metal tubes, such as, for example, stainless-steel tubes, in a pressure-stable manner and with minimal dead space by introducing a monolithic column into a metal tube of slightly larger diameter and then applying the metal tube to the sorbent by means of cold forming until it is in contact with the sorbent with minimal dead space.

The resultant monolithic HPLC columns can be operated up to column back pressures of about 500 bar owing to the mechanically more stable metal.

The present invention therefore relates to a process for the cladding of monolithic sorbents with a metal cladding and thus to a process for the production of chromatography columns at least consisting of a monolithic sorbent which has been clad with a metal tube by a) provision of a cylindrical monolithic sorbent and a metal tube having an internal diameter which is larger than the external diameter of the monolithic sorbent
b) introduction of the monolithic sorbent into the metal tube
c) application of the metal tube to the monolithic sorbent by cold forming.

Application in this case means that the metal tube is treated by cold forming until its internal diameter has been reduced sufficiently that the metal tube is in contact with the sorbent over the length of the sorbent with minimal dead space.

In a preferred embodiment, the metal tube is applied to the monolithic sorbent directly and without an interlayer of another material, such as, for example, a polymer.

In a preferred embodiment, the metal tube is made from stainless steel.

In a preferred embodiment, the cold forming in step c) is carried out by means of rotary swaging.

In a preferred embodiment, the rotary swaging in step c) is carried out using a hammering tool having two hammering jaws and the speed of rotation is between 500 min$^{-1}$ and 1500 min$^{-1}$.

In a preferred embodiment, the internal diameter of the metal tube in step a) is 0.05 to 2 mm greater than the external diameter of the monolithic sorbent.

In a particularly preferred embodiment, the internal diameter of the metal tube in step a) is 0.1 to 0.25 mm greater than the external diameter of the monolithic sorbent.

In a preferred embodiment, the monolithic sorbent consists of silica gel or inorganic/organic hybrid materials. The sorbent has optionally been functionalised by means of separation effectors.

In a preferred embodiment, a monolithic sorbent having a length of 2.5 cm to 30 cm and a diameter of 1 mm to 30 mm is provided in step a).

In a preferred embodiment, the monolithic sorbent clad with the metal tube are provided in an additional step d) with connections for solvent feed and discharge.

The present invention also relates to a chromatography column at least consisting of a monolithic sorbent clad with a metal tube, which can be produced by the process described above.

In a preferred embodiment, the metal tube is in direct contact with the sorbent with minimal dead space. This means, in particular, that no interlayer comprising other materials, such as, for example, non-porous or microporous polymers, which do not represent the sorbent is located between sorbent and metal tube.

In a preferred embodiment, the monolithic sorbent comprises silica gel. It has optionally been derivatised with separation effectors.

The present invention also relates to the use of a moulding clad in accordance with the invention for the chromatographic separation of at least two substances.

In a preferred embodiment, the chromatographic separation is carried out at a solvent pressure of at least 50 bar, preferably between 50 and 400 bar.

BRIEF DESCRIPTION OF THE DRAWINGS

FIG. 5 shows a flow chart for carrying out an investigation of the pressure stability with a silica-gel monolith with RP18 modification measuring 100-3 mm.

Figure 1:
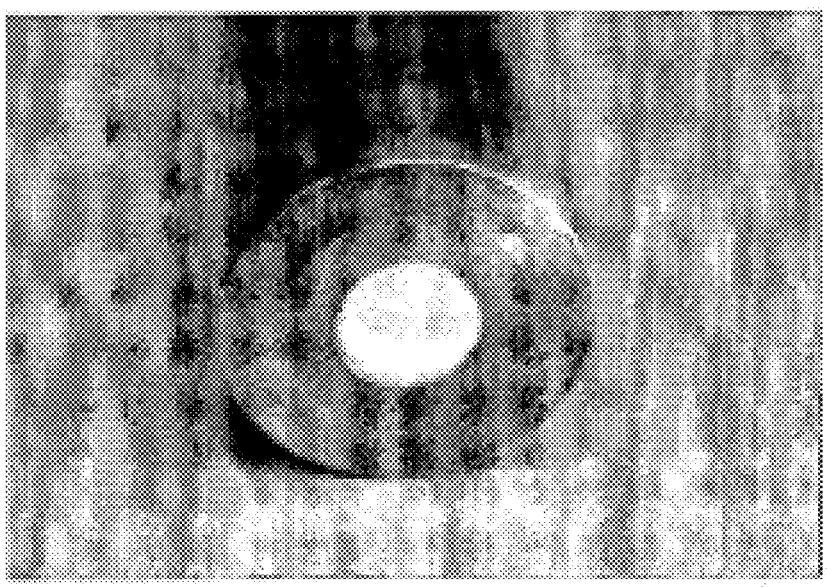
FIG. 1 shows a monolithic silica-gel sorbent which is clad directly in accordance with the invention with a stainless-steel tube. There is no polymeric interlayer and no cavity between sorbent and cladding.

In accordance with the invention, cladding with minimal dead space means that the dead space or cavity between monolithic moulding as sorbent and the cladding is so small that it causes no adverse effect on the separation efficiency of the chromatography column.

In accordance with the invention, a chromatography column consists at least of a sorbent and a cladding. In general, the chromatography column additionally has seals and/or filters and connections for the feed of sample and eluent. The chromatography column can be provided directly with corresponding connections or inserted into a cartridge system.

Chromatography columns and the use thereof are known to the person skilled in the art.

Cold forming, also cold working, is known to the person skilled in the art from metalworking. It involves processes in which metal tubes are shaped without the action of high temperatures. The temperature during the shaping in these processes is generally below 100° C., typically room temperature. Examples of cold forming are drawing, pilgering and rotary swaging. A common feature of all cold forming processes is that they can change, in particular reduce, at least the internal diameter of a tube. Typically, the external diameter and possibly the wall thickness of the metal tube are also changed at the same time.

Drawing, also called cold drawing, is a process in which the metal tube is drawn through a die that is smaller than the tube. In order to facilitate this, the tube is slightly tapered on one side or machined in such a way that it fits into the die. It is then pulled through the die on a draw bench. Cold drawing processes which work without a mandrel and those which work with a mandrel or arbour which defines the internal diameter of the tube are known. The process according to the invention is carried out without a mandrel.

Pilgering or tube narrowing typically reduces the external diameter, the internal diameter and the wall thickness. Pilgering is carried out with the aid of pilgering rolls. An apparatus which is suitable, for example, has a frame with two roll jaws which have an approximately conically tapering gap. The roll jaws can roll on the tube to be rolled and thus reduce the external diameter and thus also the wall thickness and the internal diameter of the tube passing through. In addition, the tube or rolls often rotate during the passage, so that a precisely circular tube cross section is produced.

Rotary swaging, previously also called rotary hammering, is a precise process for non-cutting forming of tubes, rods and other rotationally symmetrical workpieces.

The rotary swaging process is a cold forming process in which the cross section of solid rods or tubes is reduced by the action of force.

It belongs to the area of net shape forming processes, which are distinguished by the fact that the final contour of the formed workpieces is achieved without or with only minimal cutting. In rotary swaging, the forming dies (swaging jaws) are arranged concentrically around the workpiece. The forming dies oscillate at high frequency with a short stroke and thus exert radial pressure forces on the surrounded workpiece and thus give the treated workpiece a smaller cross section. In most cases, a die set consists of two or four swaging jaws. Depending on the application, it is also possible to employ two to eight jaws.

Monolithic sorbents in the sense of the present invention are inorganic, organic or inorganic/organic hybrid materials in the form of a columnar or cylindrical moulding. They consist of a single, preferably homogeneous, moulding. Examples of suitable materials are polymers, optionally correspondingly functionalised, such as polyacrylamides, polyacrylates, vinyl polymers or polystyrene/divinylbenzene copolymers, or silica gel, silicates, metal oxides, such as aluminium oxide, iron hydroxides, hydroxylapatite or glass, or also composite materials, for example comprising silicon dioxide with contents of other oxides, such as, for example, $ZrO_2$. Furthermore suitable are inorganic/organic hybrid materials. These can be, for example, on the one hand organic/inorganic copolymers or silica hybrid materials, in which the monomer sol for the preparation comprises not only alkoxysilanes, but also organoalkoxysilanes, i.e. typically at least 10%, preferably 20 to 100% of organoalkoxysilanes. Particular preference is given to silica gel or silica hybrid materials. These are preferably prepared from alkoxysilanes by means of a sol-gel process.

Suitable alkoxysilanes are tetraalkoxysilanes $(RO)_4Si$, where R is typically an alkyl, alkenyl or aryl radical, such as C1 to C20 alkyl, C2 to C20 alkenyl or C5 to C20 aryl, preferably a C1 to C8 alkyl radical. Particular preference is given to tetraethoxy- and in particular tetramethoxysilane. The tetraalkoxysilane may equally contain different alkyl radicals. The alkoxysilanes can also be employed in prepolymerised form as, for example, oligomers instead of in their monomeric form.

In another embodiment, organoalkoxysilanes or mixtures of organoalkoxysilanes with tetraalkoxysilanes can be employed instead of an alkoxysilane or mixtures of two or more alkoxysilanes. Suitable organoalkoxysilanes are those in which one to three, preferably one, alkoxy group(s) of a tetraalkoxysilane has (have) been replaced by organic radicals, such as, preferably, C1 to C20 alkyl, C2 to C20 alkenyl or C5 to C20 aryl. Further organoalkoxysilanes are disclosed, for example, in WO 03/014450 or U.S. Pat. No. 4,017,528. The alkoxysilanes and organoalkoxysilanes can also be employed in prepolymerised form as, for example, oligomers instead of in their monomeric form.

The tetraalkoxysilanes and organoalkoxysilanes are typically employed in the form of a 2 to 25%, preferably 5 to 10% (% by weight), solution in an organic solvent, such as, for example, toluene or ethanol. WO 95/03256 and particularly WO 98/29350 disclose processes which are preferred in accordance with the invention for the production of inorganic monolithic mouldings by a sol-gel process.

Furthermore, monolithic sorbents in the sense of the present invention are monolithic sorbents produced by means of 3D printing, in particular those comprising pressure- and solvent-stable thermoplastics.

In a preferred embodiment, the thermoplastic polymer is selected from the group of the polyether imides, polyarylates, polyether ketones, polyesters, polyamides, polyimides, polyamide imides, polybenzimidazoles, polyphenylene sulfides, polyphenyl sulfones or polyoxymethylene as well as mixtures of two or more of these materials.

In a preferred embodiment, the thermoplastic polymer has a melting point above 150° C.

In a particularly preferred embodiment, the thermoplastic polymer is PEEK (polyether ether ketone) or PPS (polyphenylene sulfide).

In a further preferred embodiment, the thermoplastic polymer comprises additives, such as, for example, fibre materials, inorganic materials or pigments, for example chalk, talc, mica or inorganic oxides, such as silicon dioxide, aluminium oxide, silicon carbide, glass or carbon fibres, preferably silicon dioxide, aluminium oxide, titanium dioxide, zirconium oxide, or silicon carbide or mixtures thereof, particularly preferably silicon dioxide.

The monolithic sorbents, also called porous mouldings or mouldings, are columnar, i.e. cylindrical. Typical diameters are between 0.5 mm and 10 cm, preferably between 1 mm and 5 cm. Typical lengths are between 1 cm and 50 cm, preferably between 2.5 cm and 25 cm.

In accordance with the invention, the monolithic sorbents have a monomodal, bimodal or oligomodal pore structure. They preferably have at least macropores having a diameter greater than 0.1 µm, which serve as through-flow pores. The macropores typically have diameters between 0.1 and 10,000 µm, preferably between 0.5 and 1000 µm. In a preferred embodiment, the moulding has a bimodal or oligomodal pore distribution, in which, in addition to the macropores, mesopores having a pore diameter between 2 and 500 nm, preferably between 5 and 100 nm, for example, are also present. In a particularly preferred embodiment, the mesopores are located in the walls of the macropores and thus increase the surface area of the moulding.

Preferred monolithic sorbents have a bimodal pore system with macropores as through-flow pores having a macropore diameter of about 0.2 to 5 µm and mesopores in the walls of the macropores having a diameter of 4 to 50 nm.

Through-flow pores are pores or channels which allow the through-flow of, for example, a liquid or a gas through a moulding. The liquid can enter the moulding here at one point and exit it again at another point. In the case of columnar mouldings, the liquid preferably enters at one end of the column and exits again at the other end. Correspondingly, pores which are located only in the form of a notch in the surface of a moulding are not through-flow pores.

The diameters of the macropores are typically measured by means of mercury porosimetry, while the diameters of the mesopores are determined by means of nitrogen adsorption/desorption by the BET method.

The total pore volume of the mouldings employed in accordance with the invention is typically between 0.1 ml/g and 10 ml/g, preferably between 1 ml/g and 8 ml/g. The surface area of the mouldings employed in accordance with the invention is typically between 1 $m^2/g$ and 1000 $m^2/g$, preferably between 5 $m^2/g$ and 500 $m^2/g$.

Cladding for monolithic sorbents should ideally satisfy all the following properties:
  solvent-stable to solvents which are customary in chromatography, such as, for example, acetonitrile, MeOH, water, dioxane, heptane, etc., since the mobile phase consists of one or more of these components.
  mechanically stable, in order to be able to chromatograph faster without problems at relatively high flow rates. At relatively high flow rates, a back pressure builds up within the column. The cladding should also not change its geometry at a back pressure of up to 400 bar.
  contact with the monolithic column body with minimal dead space, in order to prevent losses of separation efficiency and fronting of the substance peaks or pre-peaks due to uncontrolled eluent streams at the metal/column body interface.
  pore-free, in order to prevent disadvantageous tailing of the substance peaks due to uncontrolled diffusion processes in micropores of the cladding.

It has now been found, unexpectedly, that a process known from metalworking, cold forming, is suitable for cladding monolithic sorbents with metal tubes. It is been found that even very rigid and brittle mouldings comprising silica gel can be clad by means of cold forming. The monolithic sorbent does not break during the cold forming. Instead, a cladding forms which is in uniform and direct contact with the sorbent with minimal dead space. In contrast to known processes, no interlayer is present between the sorbent and the metal cladding in the process according to the invention.

For the process according to the invention, a columnar monolithic sorbent and a metal tube is provided. In order that the sorbent can be pushed into the metal tube, the tube must have an internal diameter which is greater than the diameter of the sorbent. The metal tube typically has an internal diameter which is 0.05 to 2 mm greater than the external diameter of the monolithic sorbent. The internal diameter of the metal tube and the diameter of the monolithic sorbent are preferably as similar as possible in order that a large gap does not form between sorbent and metal tube after pushing in. The internal diameter of the metal tube is preferably between 0.05 and 1 mm, particularly preferably between 0.1 and 0.25 mm, greater than the diameter of the monolithic sorbent.

The metal tube can be longer, of equal length or shorter than the monolithic sorbent. If it is longer, it is cut off, or a connection, sealing or frit system can typically later be introduced into the projection on both sides. If it is shorter, the projecting sorbent is cut off on both sides after cladding, so that it terminates flush with the metal tube.

The sorbent preferably terminates flush with the cladding. The column produced in this way can then be used directly as cartridge. For example, it can be placed in the tube provided for this purpose and fixed to the tube with fitting end pieces. Installation of threads using a suitable thread cutter is also possible in order then to be able to screw on standard end pieces. Furthermore, it is also possible alternatively to install a groove into the tube in order to use a screw connection, for example a ManuCART® screw connection, for connection to the HPLC system. The person skilled in the art is familiar with various connection systems for chromatography columns.

Suitable metal tubes, preferably stainless-steel tubes, preferably have a wall thickness of 1 mm to 7.5 mm. A wall thickness between 2 and 3 mm, in particular of 2.5 mm, is particularly preferred.

The metal tubes can consist, for example, of stainless steel, steel or titanium. Stainless-steel tubes are preferred.

Suitable stainless-steel grades are 1.4435, 1.4441 and 1.4401.

The monolithic sorbent is introduced into the metal tube.

After introduction of the monolithic sorbent into the metal tube, the cold forming of the metal tube onto the monolithic sorbent is carried out.

Suitable cold-forming processes are pilgering, drawing or rotary swaging. The cold forming is preferably carried out by means of rotary swaging.

The rotary swaging is preferably carried out in a number of passes, in which swaging is typically carried out continuously and from one side of the tube to the other. To this end, a hammering tool having two hammering jaws and 10 to 16 roles, particularly preferably 12 rolls, is preferably employed. The hammering head size here is preferably between 2 mm and 20 mm, particularly preferably about 10 mm. The speed of rotation is preferably between 500 $min^{-1}$ and 1500 $min^{-1}$, particularly preferably about 1000 $min^{-1}$.

If it is desired to check whether the metal tube is in contact with the sorbent in a sufficiently tight manner with minimal dead space, this can be done, for example, with reference to a chromatographic separation. With reference to the chromatograms obtained, the person skilled in the art is able to decide whether the quality of the separation is sufficient or whether deficiencies occur caused by a dead space between sorbent and cladding. An alternative test which is not quite as accurate is a pressure test. To this end, the back pressure of the column is measured on application of a solvent. The person skilled in the art is familiar with the back pressures that are to be expected for the corresponding sorbents. If these are not as high as expected, this is a sign of dead spaces between sorbent and cladding. The cold forming is carried out until a cladding with sufficiently small dead space for the proposed use is obtained.

The process according to the invention can be used to clad organic and inorganic mouldings or also inorganic/organic hybrid mouldings, as are employed as sorbents for chromatographic purposes. The process is particularly gentle, since it can be carried out at room temperature. Whereas cladding with organic polymers is often carried out at relatively high temperatures and thus, for example, temperature-sensitive separation effectors may be destroyed, this risk does not exist in the case of the process according to the invention. The monolithic sorbent may, as explained below, be functionalised with separation effectors even before cladding without the risk of the latter being destroyed during cladding.

For use for chromatographic separation of at least two substances, the monolithic sorbents clad in accordance with the invention are preferably also provided with connection systems for solvent feed and discharge and optionally filters, seals, etc. To this end, the clad sorbent can be placed in a cartridge system with the corresponding connections or connected directly. Constructions of this type are known to the person skilled in the art for chromatography columns containing particulate or monolithic sorbents.

For chromatographic separations, the mouldings are usually functionalised with separation effectors before cladding or after cladding. Functionalisation of the sorbent serves for the adjustment of certain separation properties by the introduction of certain functional groups. A functional group which can also serve for the introduction of further functional groups is an OH group. Suitable functional groups which influence the separation properties, also called separation effectors, are known to the person skilled in the art. Examples are ionic groups for ion exchange chromatography or hydrophobic groups for reversed-phase chromatography. Suitable derivatisation processes and suitable separation effectors are known to the person skilled in the art and are described in manuals such as Packings and Stationary Phases in Chromatographic Techniques (K. K: Unger ed.; Marcel Dekker, New York and Basle (1990)) or Porous Silica (K. K. Unger ed.; Elsevier, Amsterdam, Oxford, New York (1979)). Preferred separation effectors are amino groups
amino-functional groups
alkyl groups, in particular C8 and C18 groups
diol
cyano
phenyl
cation exchangers, such as, for example, $SO_3^{2-}$
anion exchangers The separation effectors can be applied before or after the cladding according to the invention. The separation effectors are preferably applied before cladding. This is possible without problems since the cladding with the metal tube takes place at room temperature and the separation effectors are not burnt off at the interface to the cladding, as is often the case, for example, in the case of claddings with organic polymers, since they are applied at elevated temperatures.

The monolithic sorbents clad in accordance with the invention exhibit excellent separation properties. Even after storage in solvents and frequent use at various pressures, no deterioration of the separation efficiencies is evident. The sorbents clad in accordance with the invention can be employed at solvent pressures up to or even above 500 bar, preferably between 50 and 400 bar. The cladding according to the invention thus ensures for the first time the production of monolithic chromatography columns which are both mechanically and chemically particularly stable, and also have a cladding which is in contact with the monolithic mouldings with minimal dead space. A polymeric interlayer between sorbent and cladding is not required. The fact that the cladding is applied to the monolithic sorbent subsequently after production means that shrinkage of the sorbent during production does not play a role. The chromatography columns produced in accordance with the invention can be employed for HPLC (high pressure liquid chromatography) and UHPLC (ultra pressure liquid chromatography) processes.

Even without further comments, it is assumed that a person skilled in the art will be able to utilise the above description in the broadest scope. The preferred embodiments and examples should therefore merely be regarded as descriptive disclosure which is absolutely not limiting in any way.

The complete disclosure content of all applications, patents and publications cited above and below, and of the corresponding application EP 15196322.0, filed on 25 Nov. 2015, is incorporated into this application by way of reference.

EXAMPLES

Example 1

Silica gel monoliths measuring 150×3 mm were produced in accordance with a sol-gel process, as disclosed in WO98/29350 and EP 1843155. The resulting monoliths have a bimodal pore system having a macropore size of about 1-2 µm and mesopores of 13-15 nm. The monoliths are then placed in an accurately fitting metal tube without further application of an interlayer or pre-treatment of the metal tube and clamped into a device suitable for "rotary swaging". The stainless-steel tube is then "swaged" radially on the silica gel monoliths in a plurality of working steps with simultaneous rotation until the metal tube is in direct contact with the monoliths without dead space at the interface. The monoliths clad in this way are shortened at the ends and are then in the form of a cartridge measuring 100×3 mm without thread and end fittings (see FIG. 1).

The monoliths clad in this way are then clamped into an appropriate holder. The metal holder consists of a metal tube which is provided with a thread at each of the ends. The metal-clad monolith cartridge is placed into the tube and fixed from the outside by means of two end pieces, which are rotated onto the two threads. For final sealing, a metal frit with a metal ring which seals off the cartridge when screwed onto the holder tube, so that eluent cannot escape during pumping through, is located in the end fittings. For surface modification, the metal-clad cartridges are clamped into the metal holder and derivatised in situ with C18 silane as described in J. Chromatogr. 1130 (2006) 175-181. To this end, the silica-gel monoliths are firstly washed with ACN and dry toluene in through-flow with 1 ml/min for 2 h. A 20% (v/v) solution of octadecyldimethyl-N,N-diethylaminosilane in ACN is subsequently pumped through the column at a slow flow rate (about 0.1 ml/min) for 5 h. During this procedure, the column is located in an oven at 60° C., and, for preheating of the silane solution, a capillary with a length of 60 cm, which is likewise located in the oven, is connected to the top of the column.

The column produced in this way is clamped into a suitable HPLC system and tested for separation efficiency and peak symmetry by chromatography with ACN/water (60/40; v/v).

HPLC Conditions:
Eluent: ACN/water 60/40
Flow rate: 0.85 ml/min
Detection: UV 254 nm
Temperature: RT
Injection volume: 1.0 µl

| Samples: | thiourea | 2.1 mg |
|---|---|---|
| | biphenyl-2-ol | 5.4 mg |
| | progesterone | 11.6 mg |
| | hexanophenone | 12.3 mg |
| | anthracene | 1.8 mg dissolved in 100 ml |

Figure 2:
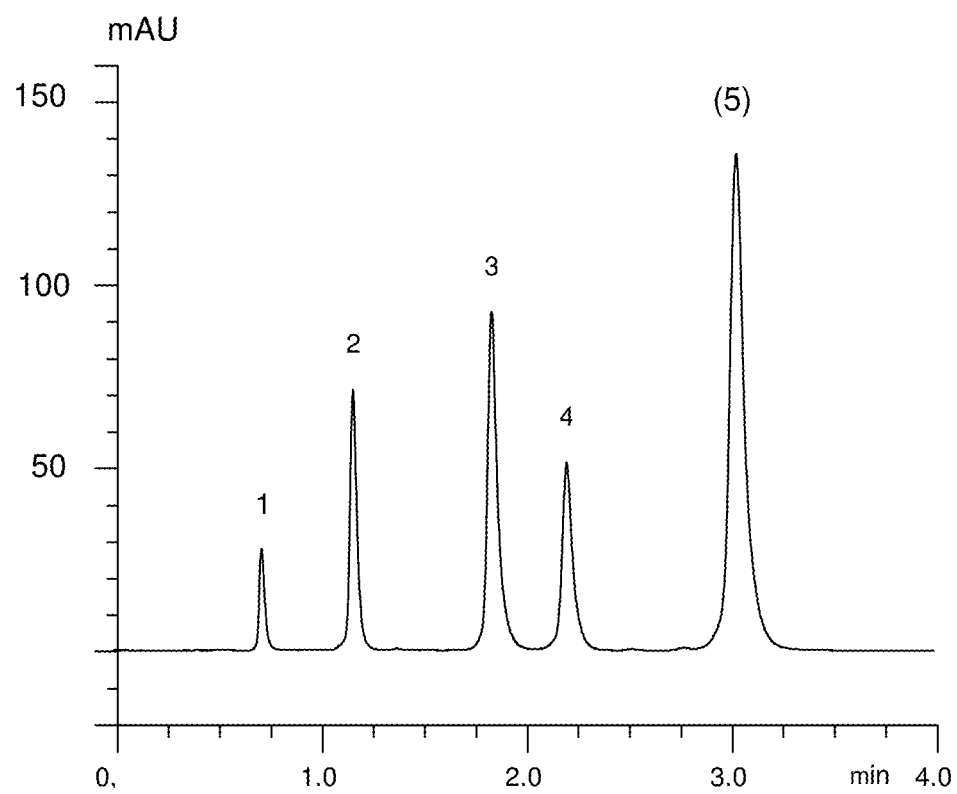
FIG. 2 shows a chromatogram which has been produced by chromatography on a monolithic silica-gel sorbent, clad directly with a metal tube and RP 18-derivatised in situ measuring 100×3 mm. Further details can be found in Example 1.

The chromatogram obtained is shown in FIG. 2.

The column shows the base line separation of 5 substances; anthracene (big 5) shows an N/m: 96.110 and a peak symmetry of Tusp: 1.3 (slight tailing). No double peaks or fronting, which could give indications of dead spaces between monolith and metal tube, are observed.

Example 2

A silica-gel monolith measuring 150×3 mm was produced by a sol-gel process as described under 1). It is subsequently derivatised in a 20% solution of octadecyldimethyl-N,N-diethylaminosilane in toluene under reflux for 5 h. The monolith is then washed in n-heptane and dried. The monolith is subsequently end-capped in a 20% solution of trimethylsilyl-imidazole (TMSI) in ACN at 60° C. for 2.5 h and washed in ACN.

The monolith derivatised as C18e is then clad directly with a metal tube as under 1) and tested for chromatographic testing in a holder by means of an HPLC unit.

HPLC Conditions:
Eluent: ACN/water 60/40
Flow rate: 0.85 ml/min
Det. UV 254 nm
Temp. RT
Inj. vol.: 1.0 µl

| Samples | thiourea | 2.1 mg |
|---|---|---|
| | biphenyl-2-ol | 5.4 mg |
| | progesterone | 11.6 mg |
| | hexanophenone | 12.3 mg |
| | anthracene | 1.8 mg dissolved in 100 ml |

Figure 3:
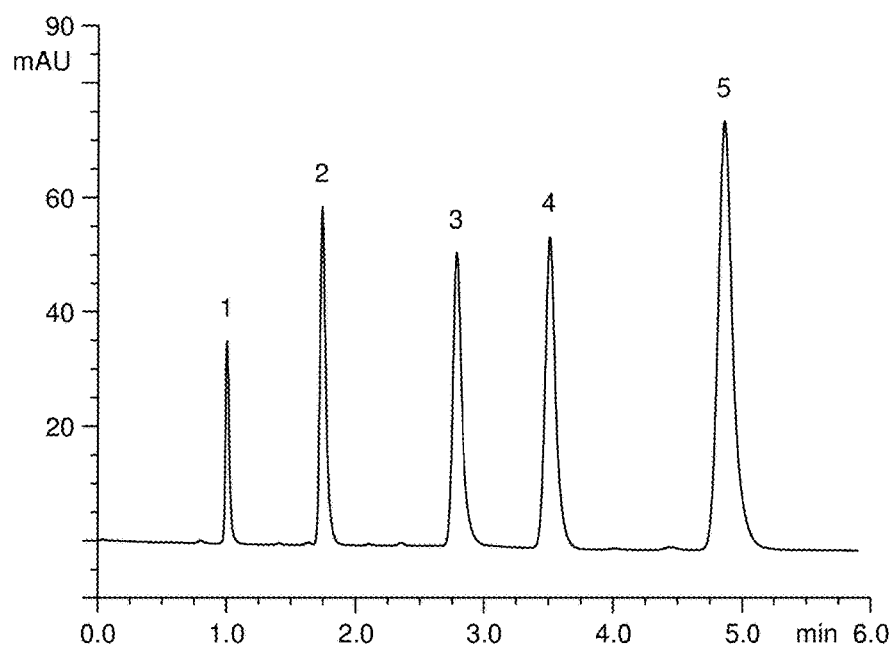
FIG. 3 shows a chromatogram which has been produced by chromatography on a monolithic silica-gel sorbent with C18e modification, clad directly with a metal tube measuring 150×3 mm. Further details can be found in Example 2.

The chromatogram obtained is shown in FIG. 3. The following table additionally reproduces the results numerically:

| No. | Ret. Time min | Peak name | K' | TUSP | N/m |
|---|---|---|---|---|---|
| 1 | 1.008 | Thiourea | 0.00 | 1.31 | 40370 |
| 2 | 1.748 | Biphenyl-2ol | 0.73 | 1.32 | 51370 |
| 3 | 2.787 | Progesterone | 1.76 | 1.41 | 52730 |
| 4 | 3.513 | Hexanophenone | 2.48 | 1.23 | 63940 |
| 5 | 4.867 | Anthracene | 3.82 | 1.28 | 62630 |

Anthracene is chromatographed with a separation efficiency of 62.630 N/m and a peak symmetry of 1.28 Tusp. Since the cladding is carried out in the cold state, burning-off of C18-silane in the edge region of the monoliths (as usually observed in the case of plastic cladding applied to the monoliths at high temperatures, such as, for example, about 400° C.) does not occur. The process according to the invention therefore enables monoliths to be clad with the metal tube as C18e derivative without further aftertreatment.

Example 3

A further silica-gel monolith measuring 150×3 mm was produced by a sol-gel process and C18e derivatisation as described under 2) and clad with a metal tube.

The monolith derivatised as C18e is then tested by chromatography as described under 1).
HPLC Conditions:
Eluent: ACN/water 60/40
Flow rate: 0.85 ml/min
Det. UV 254 nm
Temp. RT
Inj. vol.: 1.0 µl

| Samples: | thiourea | 2.1 mg |
| --- | --- | --- |
| | biphenyl-2-ol | 5.4 mg |
| | progesterone | 11.6 mg |
| | hexanophenone | 12.3 mg |
| | anthracene | 1.8 mg dissolved in 100 ml |

Figure 4:
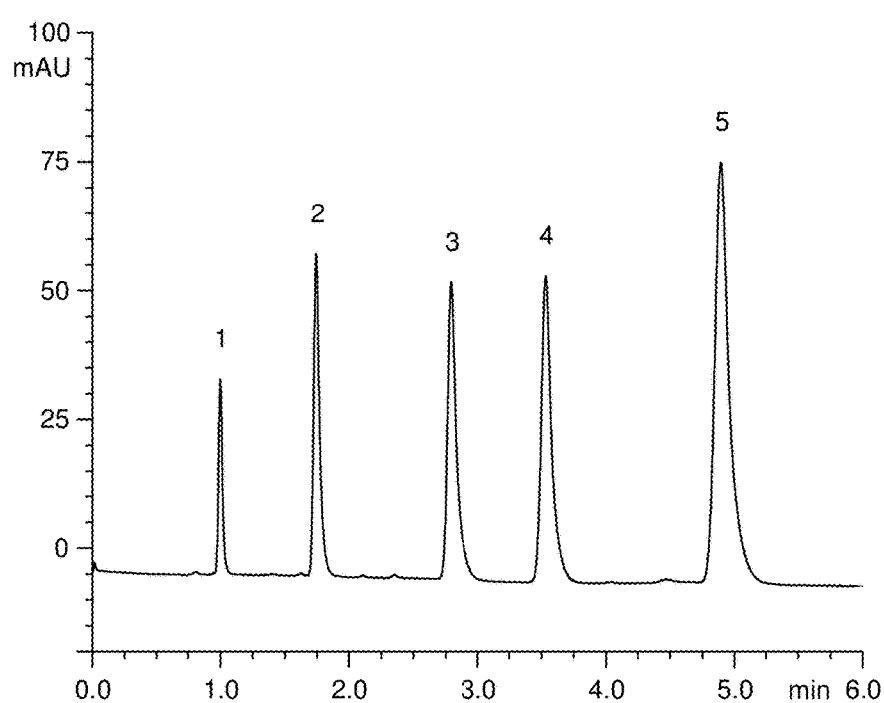
FIG. 4 shows a further chromatogram which has been produced by chromatography on a monolithic silica-gel sorbent with C18e modification, clad directly with a metal tube measuring 150×3 mm. Further details can be found in Example 3.

The chromatogram obtained is shown in FIG. 4. The following table additionally reproduces the results numerically:

| No. | Ret. Time min | Peak name | K' | TUSP | N/m |
| --- | --- | --- | --- | --- | --- |
| 1 | 0.998 | Thiourea | 0.00 | 1.29 | 37140 |
| 2 | 1.743 | Biphenyl-2ol | 0.75 | 1.44 | 50870 |
| 3 | 2.793 | Progesterone | 1.80 | 1.57 | 60453 |
| 4 | 3.532 | Hexanophenone | 2.54 | 1.43 | 71930 |
| 5 | 4.893 | Anthracene | 3.90 | 1.50 | 72010 |

Anthracene is chromatographed with a separation efficiency of 72.010 N/m and a peak symmetry of 1.50 Tusp. No double peaks or fronting, which would indicate a dead space between metal tube and monolith, are observed.

Example 4

A silica-gel monolith measuring 100×3 mm was produced as described under 1) and tested for pressure stability.

To this end, the metal cartridge is placed in the metal holder and connected to an HPLC system. Chromatography is then carried out with a flow rate of 0.85 ml/min and a resultant column back pressure of 50 bar, and the performance data are recorded. The flow rate is subsequently doubled to 1.7 ml/min, which has the consequence of doubling the column back pressure (100 bar). The flow rate is then doubled twice more to 3.4 ml/min and 6.8 ml/min in each case. The resultant column back pressure under these conditions is 195 bar and 326 bar respectively. Under the latter conditions, the back pressure would have had to be about 400 bar. Small leaks at the screw joints in the metal holder have probably led to a drop in pressure. A subsequent retest under the starting conditions with a flow rate of 0.85 ml/min gives equivalent performance values as at the beginning, which allows the conclusion that the column is stable under these conditions.

Figure 6:
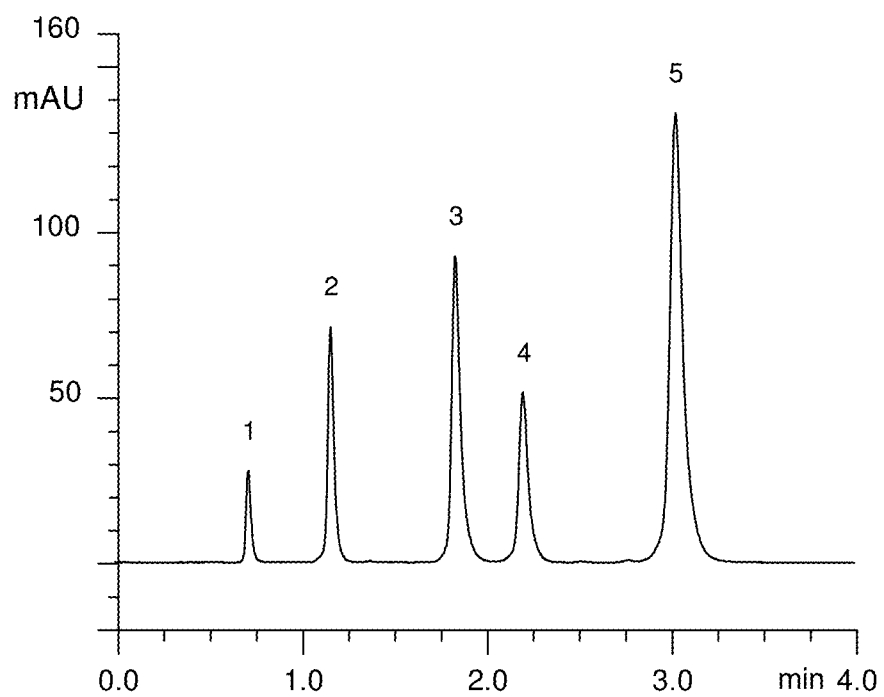
FIGS. 6 A to E show the associated chromatograms. Further details can be found in Example 4.
Figure 6:
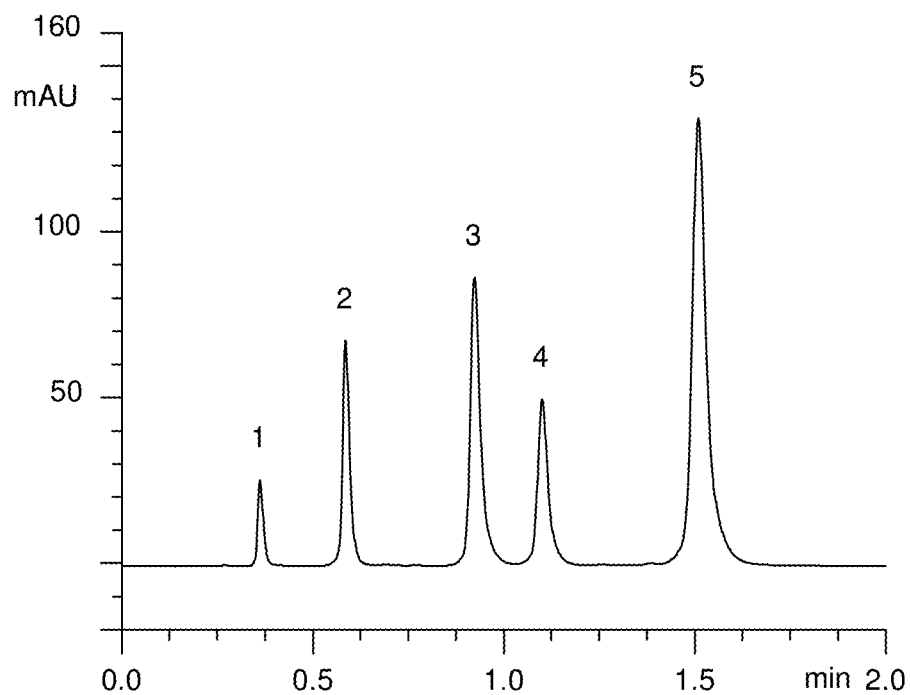
Figure 6:
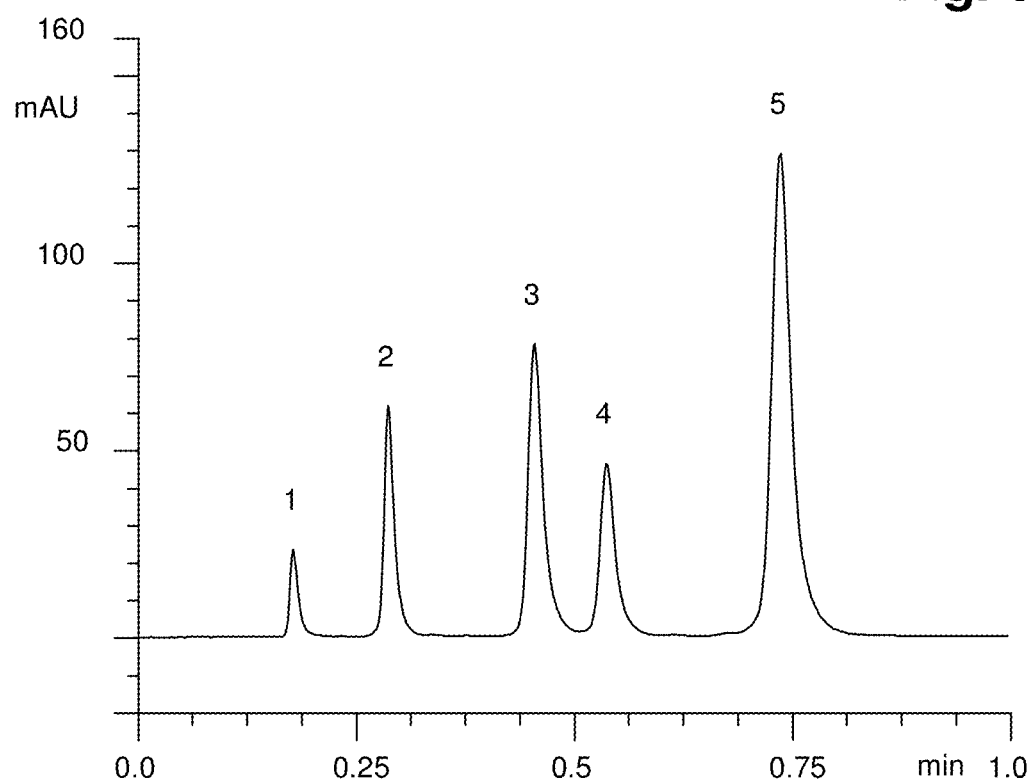
Figure 6:
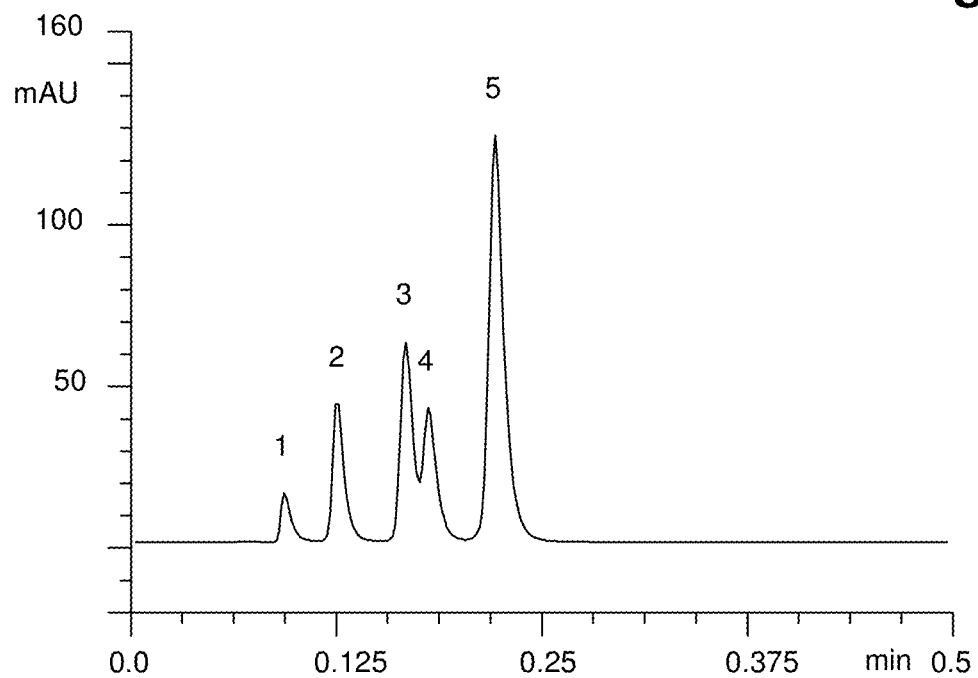
Figure 6:
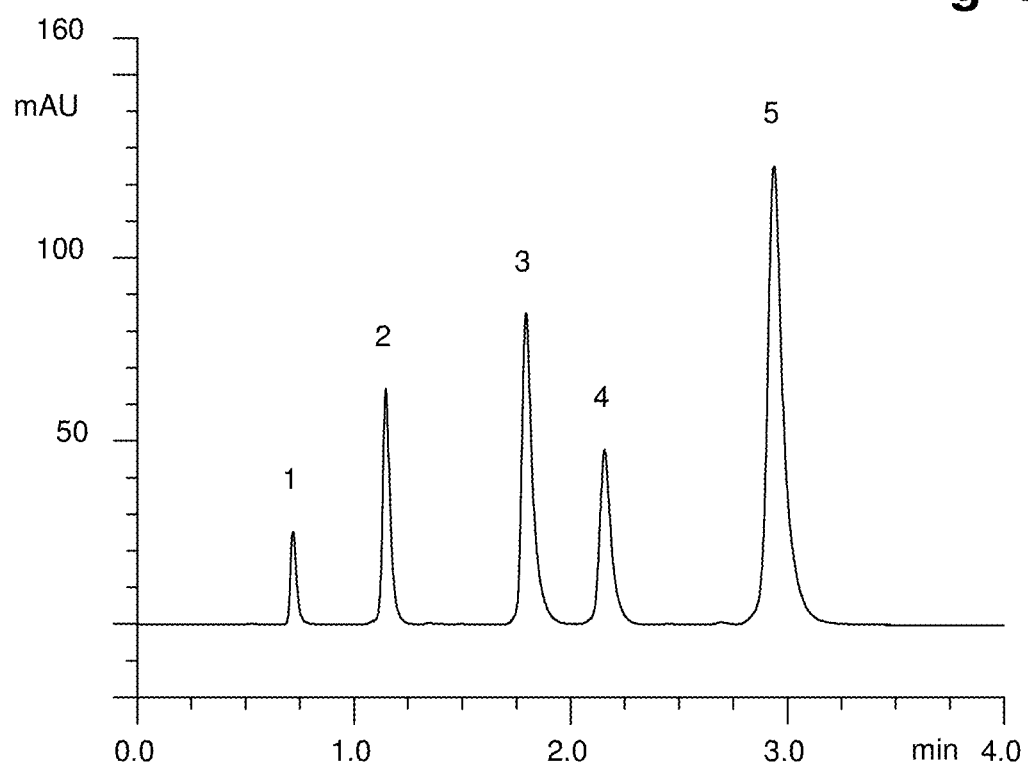

The chromatography scheme described above is shown again as a flow chart in FIG. 5. FIGS. 6 A to E show the chromatograms obtained in the respective steps. A here shows the chromatogram obtained at 50 bar, B shows the chromatogram obtained at 100 bar and so on. Chromatogram E shows the retest carried out again at 50 bar.

The invention claimed is:

1. Process for the production of a chromatography column containing a cylindrical monolithic sorbent which has been clad with a metal tube, which comprises:
    a) providing a cylindrical monolithic sorbent and a metal tube having an internal diameter which is larger than the diameter of the cylindrical monolithic sorbent;
    b) introducing the cylindrical monolithic sorbent into the metal tube; and
    c) applying the metal tube to the cylindrical monolithic sorbent by cold forming which comprises drawing, pilgering and/or rotary swaging of the metal tube onto the cylindrical monolithic sorbent.

2. Process according to claim 1, wherein the metal tube is a stainless-steel tube.

3. Process according to claim 1, wherein the cold forming in step c) is carried out by rotary swaging.

4. Process according to claim 3, wherein the rotary swaging in step c) is carried out using a hammering tool having two hammering jaws and the speed of rotation is between 500 $min^{-1}$ and 1500 $min^{-1}$.

5. Process according to claim 1, wherein, in step a), the internal diameter of the metal tube is 0.1 to 0.25 mm greater than the diameter of the cylindrical monolithic sorbent.

6. Process according to claim 1, wherein the cylindrical monolithic sorbent consists of silica gel or inorganic/organic hybrid materials.

7. Process according to claim 1, wherein the cylindrical monolithic sorbent provided in step a) has a length of 1 cm to 30 cm and the diameter of the cylindrical monolithic sorbent is from 1 mm to 5 cm.

8. Process according to claim 1, wherein the cylindrical monolithic sorbent clad with the metal tube resulting from step c) is provided, in an additional step d), with connections for solvent feed and discharge.

9. Process according to claim 1, wherein the cylindrical monolithic sorbent provided in step a) has been derivatised with separation effectors.

10. Chromatography column having a cylindrical monolithic sorbent which has been clad with a metal tube, which is produced by the process of claim 1.

11. Chromatography column according to claim 10, wherein the metal tube is in direct contact with the cylindrical monolithic sorbent.

12. Chromatography column according to claim 10, wherein the steel the metal tube has a wall thickness between 1 mm and 7.5 mm.

13. Chromatography column according to claim 10, wherein the monolithic sorbent consists of silica gel.

14. A method for the chromatographic separation of at least two substances, comprising passing a mixture of the substances through a chromatography column of claim 10.

15. Method according to claim 14, wherein the chromatographic separation is carried out at a solvent pressure of 50 to 400 bar.

* * * * *